United States Patent [19]
Kushige et al.

[11] Patent Number: 5,557,647
[45] Date of Patent: Sep. 17, 1996

[54] BASEBAND SIGNAL DEMODULATOR

[75] Inventors: Naohide Kushige, Sagamihara; Naritoshi Saito, Hino; Mutsumu Serizawa, Tokyo, all of Japan

[73] Assignee: Kabushiki Kaisha Toshiba, Kawasaki, Japan

[21] Appl. No.: 177,678

[22] Filed: Jan. 4, 1994

[30] Foreign Application Priority Data

Jan. 6, 1993 [JP] Japan ................................. 5-000794
Jan. 13, 1993 [JP] Japan ................................. 5-004239

[51] Int. Cl.⁶ ..................................................... H04L 7/00
[52] U.S. Cl. ..................................................... 375/371
[58] Field of Search ................................. 375/355, 326, 375/327, 357, 371, 373; 370/105.3; 329/302, 307, 323, 324, 325, 346, 360, 361

[56] References Cited

U.S. PATENT DOCUMENTS 5,276,711  1/1994  Rossi ......................................... 375/355
5,309,482  5/1994  Wright et al. ............................ 375/354
5,353,312  10/1994 Cupo et al. .............................. 375/354

Primary Examiner—Stephen Chin
Assistant Examiner—Kevin Kim
Attorney, Agent, or Firm—Finnegan, Henderson, Farabow, Garrett & Dunner, L.L.P.

[57] ABSTRACT

A baseband signal demodulator which ensures, when digital signal processing for data corresponding to one time slot fails to be terminated within a duration of the time slot, a processing clock for the data even in a period exceeding the time slot. In the demodulator, a receive clock reproducer reproduces a receive clock based on a received baseband signal and a phase error data generator generates phase error data indicative of a phase error between the reproduced receive clock and a system clock for control of an entire receiver. Further, a sampling clock generator changes a phase of the system clock based on the phase error data to generate an optimum sampling clock to the baseband signal and a receive data generator generates receive data corresponding to the baseband signal sampled at its optimum positions based on the optimum sampling clock. Thereafter, a data timing adjustor adjusts synchronization of the receive data with the system clock based on the phase error data. Alternatively, a filter coefficient of the filter associated with the phase error between the system clock and the reproduced receive clock to control the phase of the received baseband signal, whereby the baseband signal for a plurality of time slots is synchronized with the single system clock. Thus, demodulation of the baseband signal having different phase errors for the plurality of time slots can be processed by using a single system clock.

15 Claims, 16 Drawing Sheets

| ADDRESS | | | | FILTER COEF. |
|---|---|---|---|---|
| MSB | | | LSB | |
| 0 | 0 | 0 | 0 | ct |
| 0 | 0 | 0 | 1 | m1 |
| 0 | 0 | 1 | 0 | m2 |
| 0 | 0 | 1 | 1 | m3 |
| 0 | 1 | 0 | 0 | m4 |
| 0 | 1 | 0 | 1 | m5 |
| 0 | 1 | 1 | 0 | m6 |
| 0 | 1 | 1 | 1 | m7 |
| 1 | 0 | 0 | 0 | p8 |
| 1 | 0 | 0 | 1 | p7 |
| 1 | 0 | 1 | 0 | p6 |
| 1 | 0 | 1 | 1 | p5 |
| 1 | 1 | 0 | 0 | p4 |
| 1 | 1 | 0 | 1 | p3 |
| 1 | 1 | 1 | 0 | p2 |
| 1 | 1 | 1 | 1 | p1 |

FIG. 16

BASEBAND SIGNAL DEMODULATOR

BACKGROUND OF THE INVENTION

1. Field of the Invention

The present invention relates to baseband signal demodulators in a receiver operated on a time division multiple access (TDMA) basis, and more particularly, to a baseband signal demodulator in a digital radio communication system capable of performing easy and stable processing of a plurality of data for a plurality of time slots including the demodulation of a baseband signal.

2. Description of the Related Art

To reduce the size and the power consumption of a mobile device and a base station in a radio communication system, the modem section of the mobile device and the base station performs modulation and demodulation of data in a digital signal processing manner in which waveform shaping, etc. is performed.

In a digital radio communication system based on TDMA communication, the modem section of the base station receives baseband signals from a plurality of mobile devices on a time-division time slot basis. Since the distance between the base station and the mobile devices and performance of the mobile devices differ for each mobile device, the optimum sampling points of baseband signals received by the base station from the respective mobile devices differ from each other for the respective time slots.

To perform digital signal processing on the baseband signals having phase errors between time slots, it is necessary to subject the baseband signals to a sampling operation at a constant sampling interval and then to an analog-to-digital (A/D) converting operation to obtain digital signals for subsequent operations.

However, since the received baseband signals have phase errors between time slots, the optimum sampling points (time at which the eye of the pattern of the received baseband signal is opened) for the A/D conversion of the received baseband signals are different from each other for the respective time slots. For the purpose of reducing a data transmission error during digital signal processing, a receive clock obtained from the received baseband signal is used for the digital signal processing.

For this reason, when the receive data sampled through the A/D conversion is subjected to digital signal processing such as waveform shaping and detection using a digital filter, it is necessary to perform the digital signal processing using a sampling clock synchronized with the receive data for each time slot as a processing clock, with the processing clock being required to be changed for each of the time slots.

However, when the digital signal processing of data for one time slot is not completed within the duration of this time slot, the processing clock must be effective during a period exceeding this time slot, which arises a problem that the handling of the processing clock is complicated.

In order to avoid the above problem, it may be so constructed that the received baseband signal is subjected to a sampling operation using a system clock of a timing common to the respective time slots and signal processing is performed using the system clock as a signal processing clock. However, this causes another problem that sampling of the received baseband signal cannot be made at the optimum sampling point, which leads to an increase in the data transmission error.

For this reason, it is impossible to use as a clock for processing of digital signals the system clock which is commonly used in the system except for the radio section and the modem sections of the base station.

Further, in the modem section, since the digital signal processing is not carried out using the system clock, there arises still another problem that a delay means is required for synchronizing a demodulation signal for each of the time slots with the system clock in subsequent demultiplexing operations.

SUMMARY OF THE INVENTION

It is an object of the present invention to ensure, when digital processing of data for one time slot is not completed within duration of the time slot, a processing clock for the data even in a time exceeding the time slot.

In accordance with an aspect of the present invention, the above object is attained by providing a baseband signal demodulator in a receiver for demodulating a received baseband signal, comprising receive clock reproduction means for reproducing a receive clock based on the received baseband signal, phase error data generation means for generating phase error data indicative of a phase error between a system clock for control of the entire receiver and a receive clock reproduced by the receive clock reproduction means, sampling clock generation means for changing a phase of the system clock based on the phase error data to generate an optimum sampling clock for the baseband signal, receive data generation means for generating receive data corresponding to a sampled result of the baseband signal based on the optimum sampling clock, and data timing adjustment means for adjusting the receive data so as to synchronize with the system clock based on the phase error data.

In accordance with another aspect of the present invention, there is provided a baseband signal demodulator in a receiver for demodulating a received baseband signal, comprising filter means for performing waveform shaping operation over a received baseband signal, receive clock reproduction means for reproducing a receive clock based on the received baseband signal, phase error data generation means for generating phase error data indicative of a phase error between a system clock for control of an entire receiver and a reproduced receive clock reproduced by the receive clock reproduction means, and filter coefficient control means for generating a filter coefficient of the filter means for correction of the phase error indicated by the phase error data to cause a phase of the baseband signal inputted to the filter to be controllably changed by using the filter coefficient.

In the present invention, a baseband signal having different phase errors for each of a plurality of time slots can be demodulated by using a single system clock. As a result, a clock for digital signal processing can be ensured and a demodulation circuit can be simplified. In addition, a synchronization circuit, etc. for subsequent multiplexing/demultiplexing operation becomes unnecessary.

BRIEF DESCRIPTION OF THE DRAWINGS

FIG. 16 is a table showing a relationship between addresses and filter coefficients stored in the RCROF coefficient control circuit.

DETAILED DESCRIPTION OF THE EMBODIMENTS

Embodiments of the present invention will be described with reference to the attached drawings.

Figure 1:
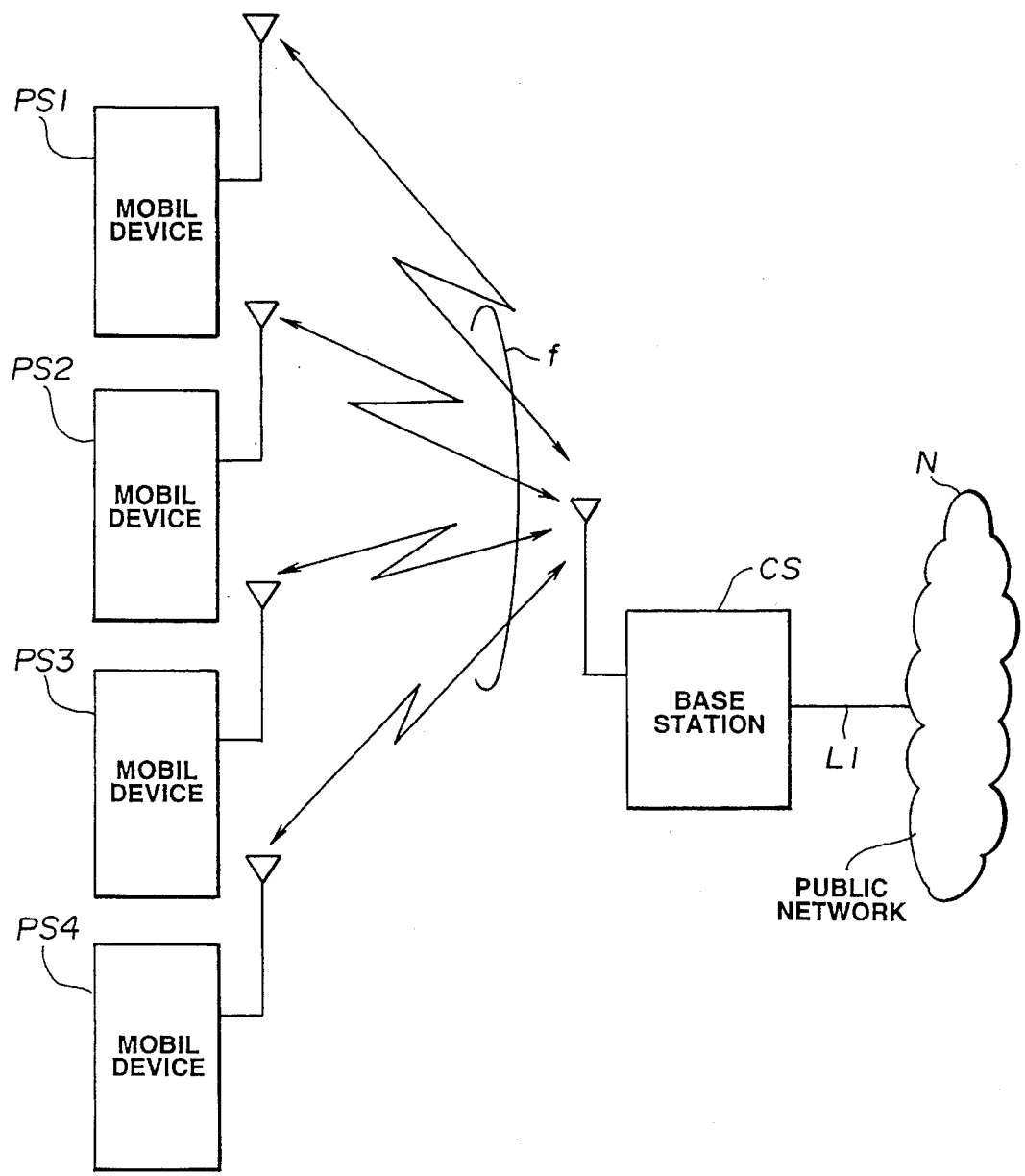
FIG. 1 is a block diagram of a digital radio communication system to which the present invention is applied.

FIG. 1 illustrates a block diagram of a digital radio communication system to which the present invention is applied. In FIG. 1, a base station CS connected at one side with a public network N through a line L1, is connected at the other side with 4 mobile devices PS1 to PS4 with an identical frequency f. That is, communication interconnection is established between the base station CS and mobile devices PS1 to PS4 based on a time division multiple access—4-time division duplex (TDMA–4TDD).

Figure 2:
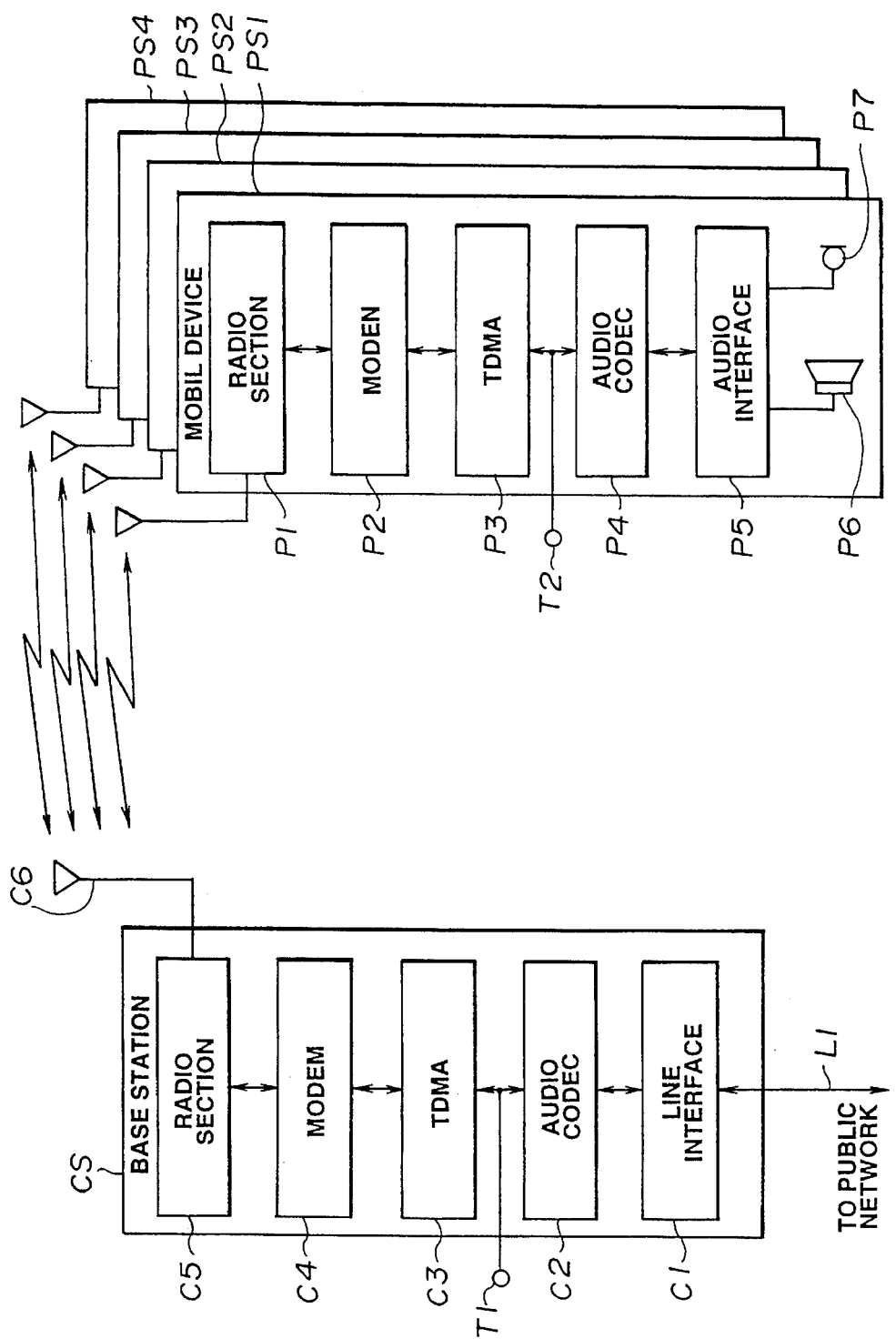
FIG. 2 is a block diagram of a base station and mobile devices in FIG. 1.

FIG. 2 is a block diagram of the base station CS and mobile devices PS1 to PS4 shown in FIG. 1.

The base station CS first receives an audio signal from the public network N through the line L1. In the base station CS, more in detail, the received audio signal is applied from a line interface C1 to an audio codec section C2 to be subjected therein to an encoding operation into a digital signal. The encoded digital signal is subjected at a TDMA section C3 to a transmission rate conversion for time division multiplexing. The digital signal subjected to the time division multiplexing is subjected at the modem C4 to a modulating operation, and then sent to a radio section C5 and an antenna C6, from which the modulated digital signal is radiated toward the respective mobile devices PS1 to PS4 in the form of a radio signal. In this connection, not only audio but also data can be input or output to or from a data input/output terminal T1. A radio signal transmitted from the respective mobile devices PS1 to PS4 is received and processed in the base station CS in accordance with a procedure opposite to the transmitting procedure.

Meanwhile, the mobile devices PS1 to PS4 receive a digital signal as the radio signal from the base station CS. In the mobile device PS1, more specifically, the received digital radio signal is selectively received at a radio section P1, subjected at a modem P2 to a demodulating operation, subjected at a TDMA section P3 to a transmission rate conversion, and then applied to an audio codec section P4. The digital signal applied to the audio codec section P4 is subjected to a decoding operation into an audio signal and then sent to an audio interface P5 to be amplified therein. The amplified signal is sent to a receiver P6 to be output therefrom. Further, as in the base station CS, the mobile devices PS1 to PS4 can handle not only audio but also data received through a data input/output terminal T2. A signal to be transmitted to the base station CS is processed in the mobile device in accordance with a procedure opposite to the above signal receiving procedure.

Description will next be made as to the time-division multiplexing/demultiplexing operation of the above digital radio communication system when the system handles an audio signal as an example.

Figure 3:
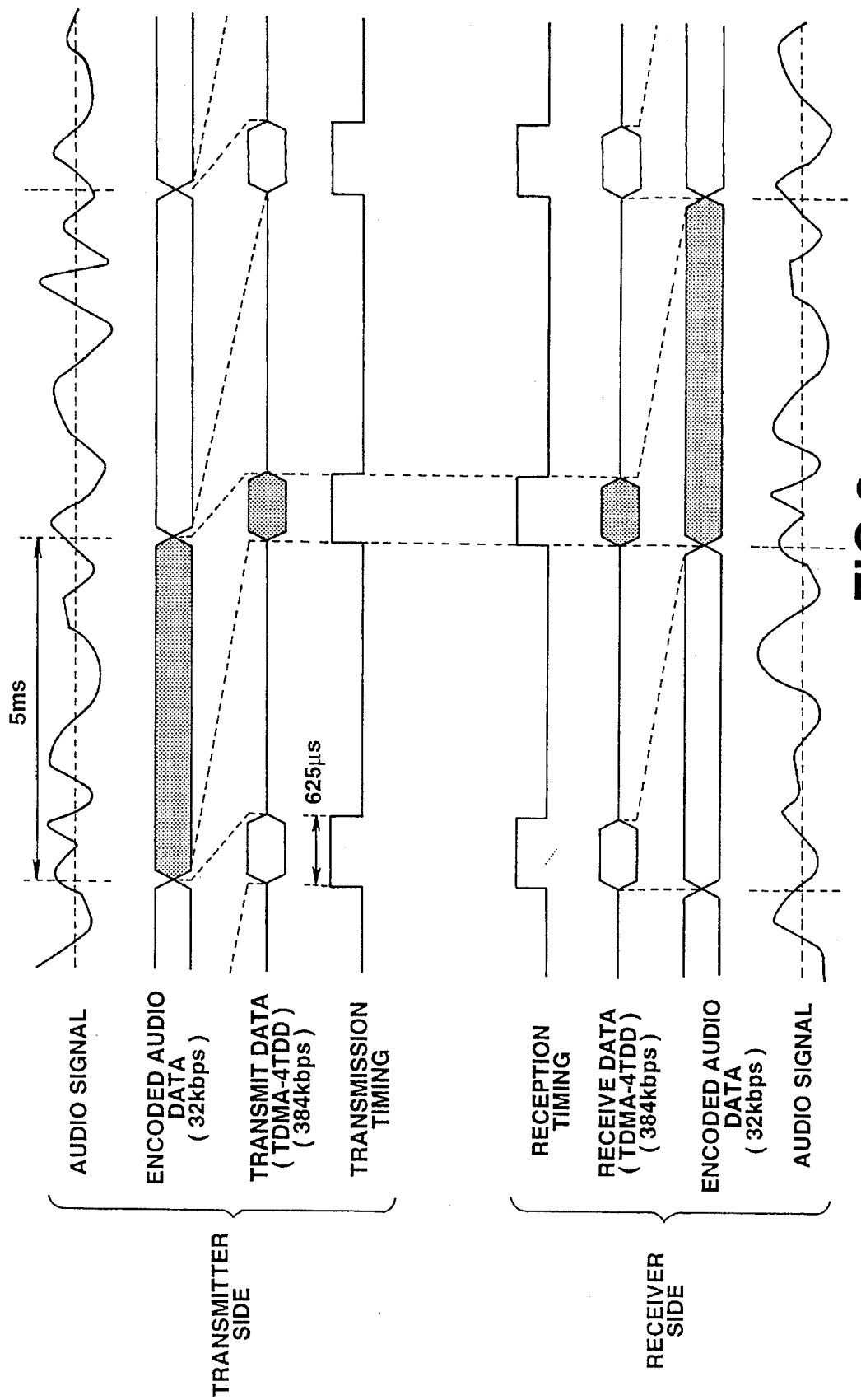
FIG. 3 is a timing chart for illustrating the time-division multiplexing and demultiplexing operation of an audio signal in the digital radio communication system.

FIG. 3 is a timing chart for illustrating the time-division multiplexing/demultiplexing operation of the present digital radio communication system. In FIG. 3, an audio signal received at the transmitter side (base station CS or one of the mobile devices PS1 to PS4) is subjected by the audio codec section to an encoding operation into a 32 kbps digital signal of intervals of 5 msec. and further to a transmission rate conversion into a 384 kbps digital signal, the 384 kbps digital signal is added to a control signal into a transmission data signal and then transmitted to the receiver side at the timing of a transmission time slot of 625 μsec.

The receiver side (one of the mobile devices PS1 to PS4 when the transmitter side is the base station CS, while, the base station CS when the transmitter side is one of the mobile devices PS1 to PS4), on the other hand, receives the transmission data signal at the timing of a reception time slot synchronized with the timing of the transmission time slot. In the receiver side, the received data signal is separated into the control signal and the encoded 384 kbps digital audio signal, only the 384 kbps digital audio signal is extracted and converted with respect to transmission rate into the original 32 kbps audio signal, the 32 kbps audio signal is then subjected at the audio codec section to a decoding operation into the original output audio signal.

Figure 4:
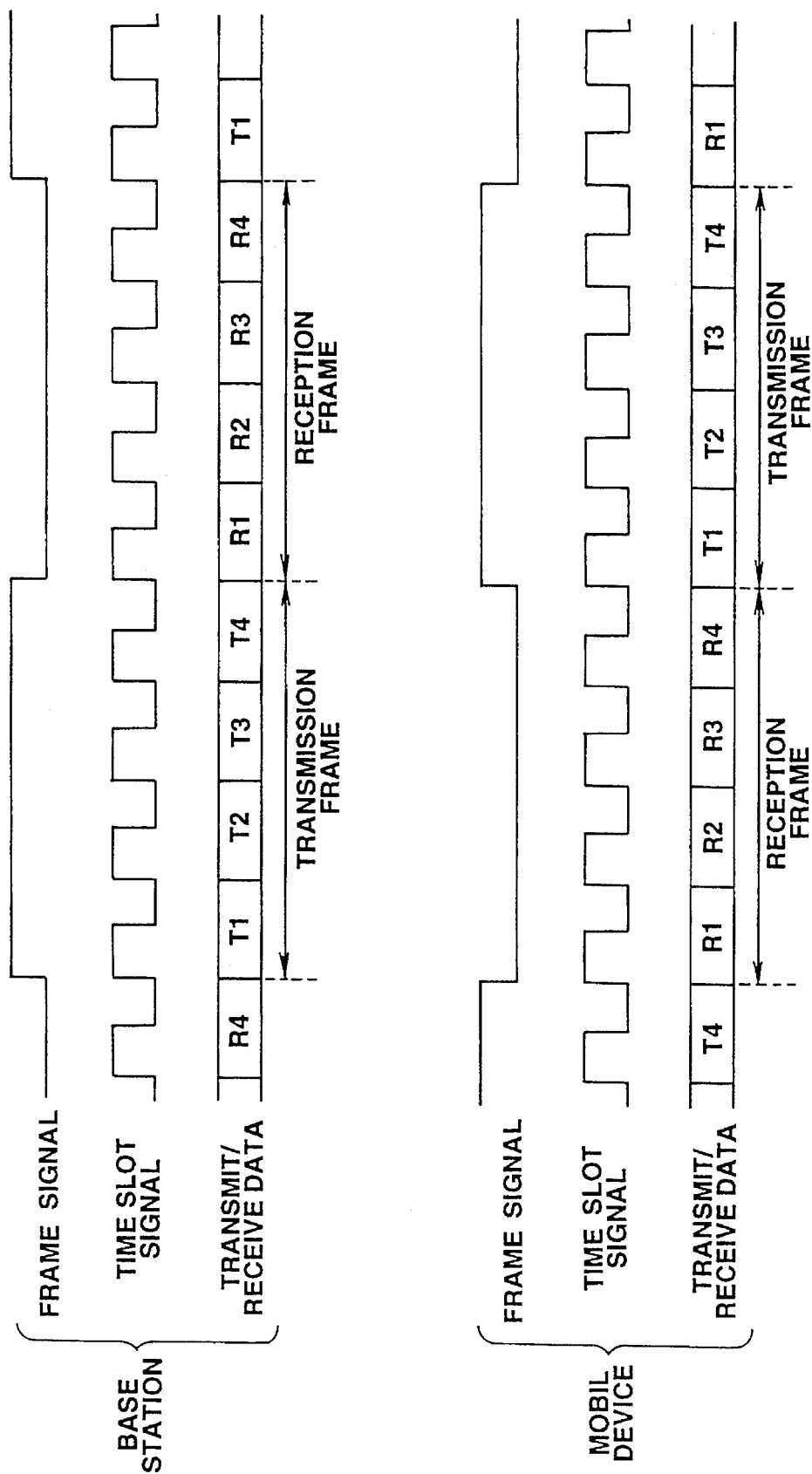
FIG. 4 is a timing chart for illustrating the concept of a TDMA-4TDD multiplex.

FIG. 4 is a timing chart for illustrating the concept of the TDMA-4TDD multiplex, that is, showing a time slot structure when the TDMA-4TDD is employed.

Although the above description has been made in connection with one time slot in FIG. 3 for convenience of explanation, 4 time slots are actually assigned to the base station CS and 4 mobile devices PS1 to PS4 as shown in FIG. 4. In other words, time slots T1 and R1 are assigned to the base station CS and mobile device PS1, time slots T2 and R2 are assigned to the base station CS and mobile device PS2, time slots T3 and R3 are assigned to the base station CS and mobile device PS3, and time slots T4 and R4 are assigned to the base station CS and mobile device PS4, the signal transmission/reception to/from the base station CS and mobile devices PS1 to PS4 being carried out on a time division basis.

Next, description will be made as to a baseband signal demodulator in the modem C4 of the base station CS.

Figure 5:
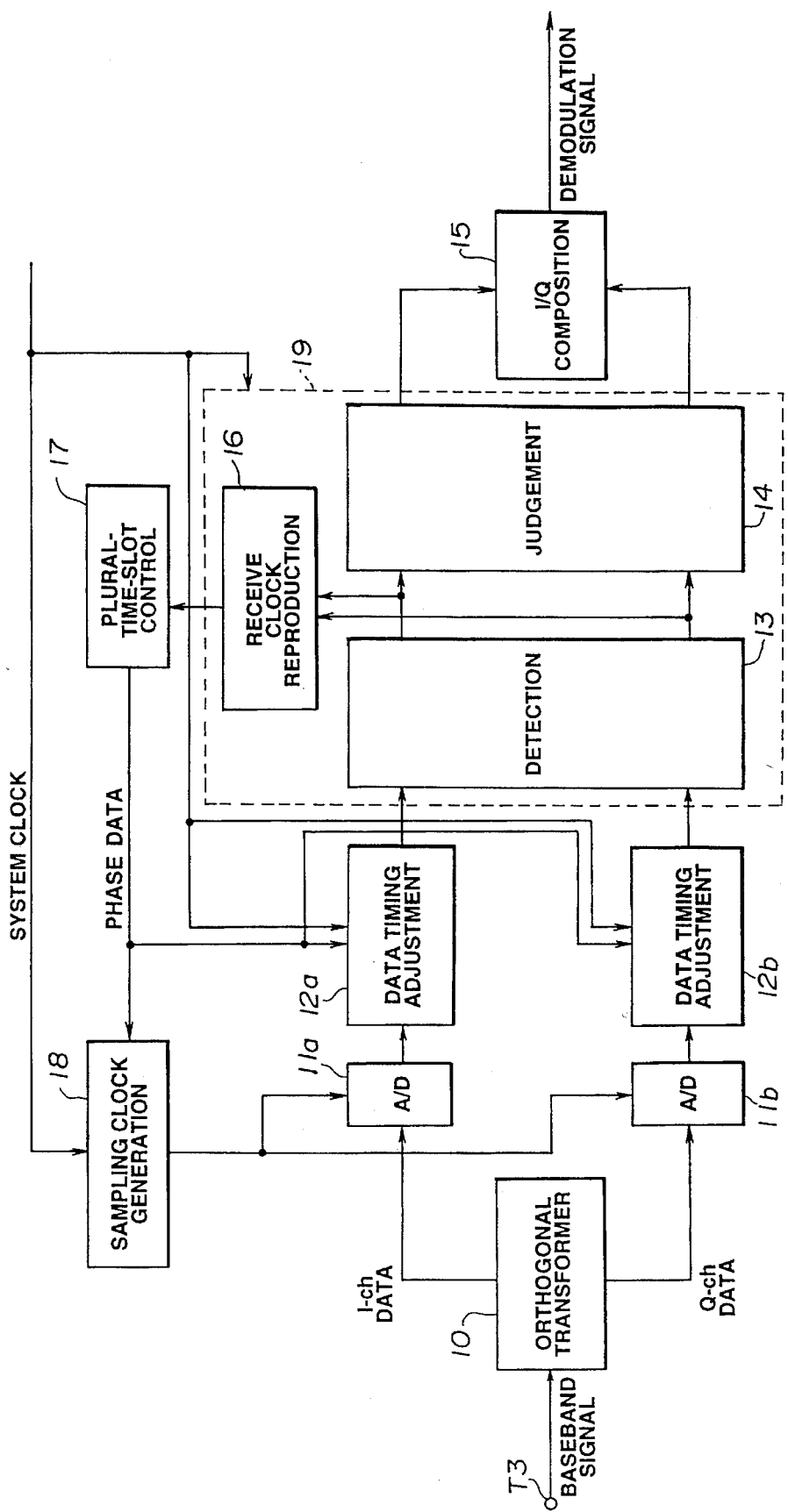
FIG. 5 is a block diagram of a baseband signal demodulator in accordance with a first embodiment of the present invention.

FIG. 5 illustrates a block diagram of a configuration of a baseband signal demodulator in accordance with a first embodiment of the present invention. The baseband signal demodulator corresponds to a demodulator section of the base station CS.

In FIG. 5, a receive clock reproduction circuit 16 reproduces a receive clock based on receive data received from a detection circuit 13. A plural-time-slot control circuit 17 generates phase data for the respective time slots necessary for control of a plurality of time slot clocks based on the receive clock received from the receive clock reproduction circuit 16. In this case, the plurality of time slots refer to the time slots assigned to the mobile devices PS1 to PS4.

A sampling clock generation circuit 18 generates a sampling clock for A/D converters 11a and 11b that is synchronized with the timing of the time slots based on the phase data received from the plural-time-slot control circuit 17 and also based on a system clock for common use of the entire base station CS. Further, data timing adjustment circuits 12a and 12b adjust the timing of the receive data based on the phase data received from the plural-time-slot control circuit 17, such that the timing of the receive data Ich and Qch having different sampling timings for the time slots is synchronized with the timing of the system clock.

The operation of the baseband signal demodulator in FIG. 1 will next be briefly described.

First of all, a baseband signal received at a terminal T3 is separated by an orthogonal transformer 10 into the aforementioned data signals Ich and Qch. The separated data signals Ich and Qch are applied respectively to the A/D converters 11a and 11b to be sampled therein based on the optimum sampling clock received from the sampling clock generation circuit 18. The sampled receive data signals are applied respectively to the data timing adjustment circuits 12a and 12b and adjusted so that the sampled receive data signals are synchronized with the timing of the common system clock to the time slots for use in a digital signal processor 19.

Thereafter, the receive data signals Ich and Qch synchronized with the system clock are applied to the detection circuit 13 where the receive data signals are subjected to digital signal processing operations through a digital filter including waveform shaping and detection. The detected data signals Ich and Qch are further judged through the digital signal processing of a judgement circuit 14.

Then, the data signals Ich and Qch judged at the judgement circuit 14 are added together in an I/Q composition circuit 15 to obtain a composite signal, and the composite signal is output as a final receive data signal. In this connection, the initial received baseband signal contains a signal for establishing initial synchronization. Further, the final receive data signal issued from the baseband signal demodulator is subjected at the TDMA section C3 to a transmission rate conversion and then subjected at the audio codec section C2 to a decoding operation.

Description will then made as to the detailed structures of major parts of the baseband signal demodulator.

Figure 6:
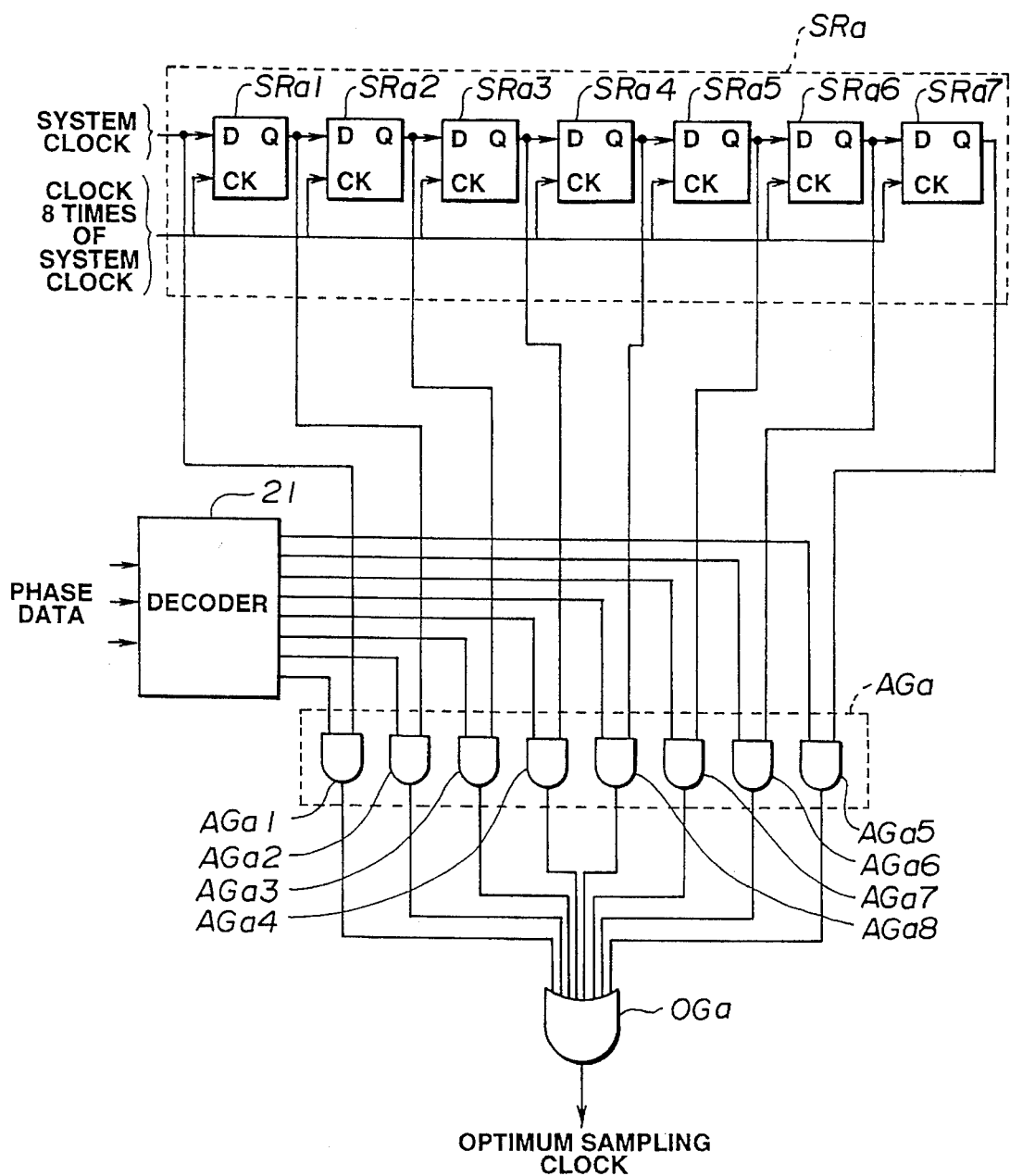
FIG. 6 is a circuit diagram of a sampling clock generation circuit in FIG. 5.

FIG. 6 is a detailed circuit diagram of a structure of the sampling clock generation circuit 18. The sampling clock generation circuit 18 of FIG. 6 includes 7 stages of shift registers SRa (SRa1 to SRa7), a decoder 21, a group of AND gates AGa1 to AGa8, and an OR gate OGa.

First of all, the system clock common to the time slots is applied to the shift registers SRa. More specifically, the system clock applied to the shift registers SRa is shifted at intervals of ⅛ period of the system clock by a clock signal having a frequency 8 times of the frequency of the system clock. Data corresponding to ⅛ period units of the system clock shifted at intervals of ⅛ period are applied from the shift registers SRa to the AND gate group AGa1 to AGa8.

Meanwhile, 3-value signals of the phase data issued from the plural-time-slot control circuit 17 are applied to the decoder 21 to be decoded therein into 8-value data signals. The decoded 8-value data signals are applied to the AND gate group AGa1 to AGa8.

Outputs of the AND gate group AGa1 to AGa8 are input to the OR gate OGa so that the OR gate OGa, when receiving the outputs from the shift registers SRa and the outputs from the decoder 21, outputs an optimum sampling clock to the A/D converters 11a and 11b.

Figure 7:
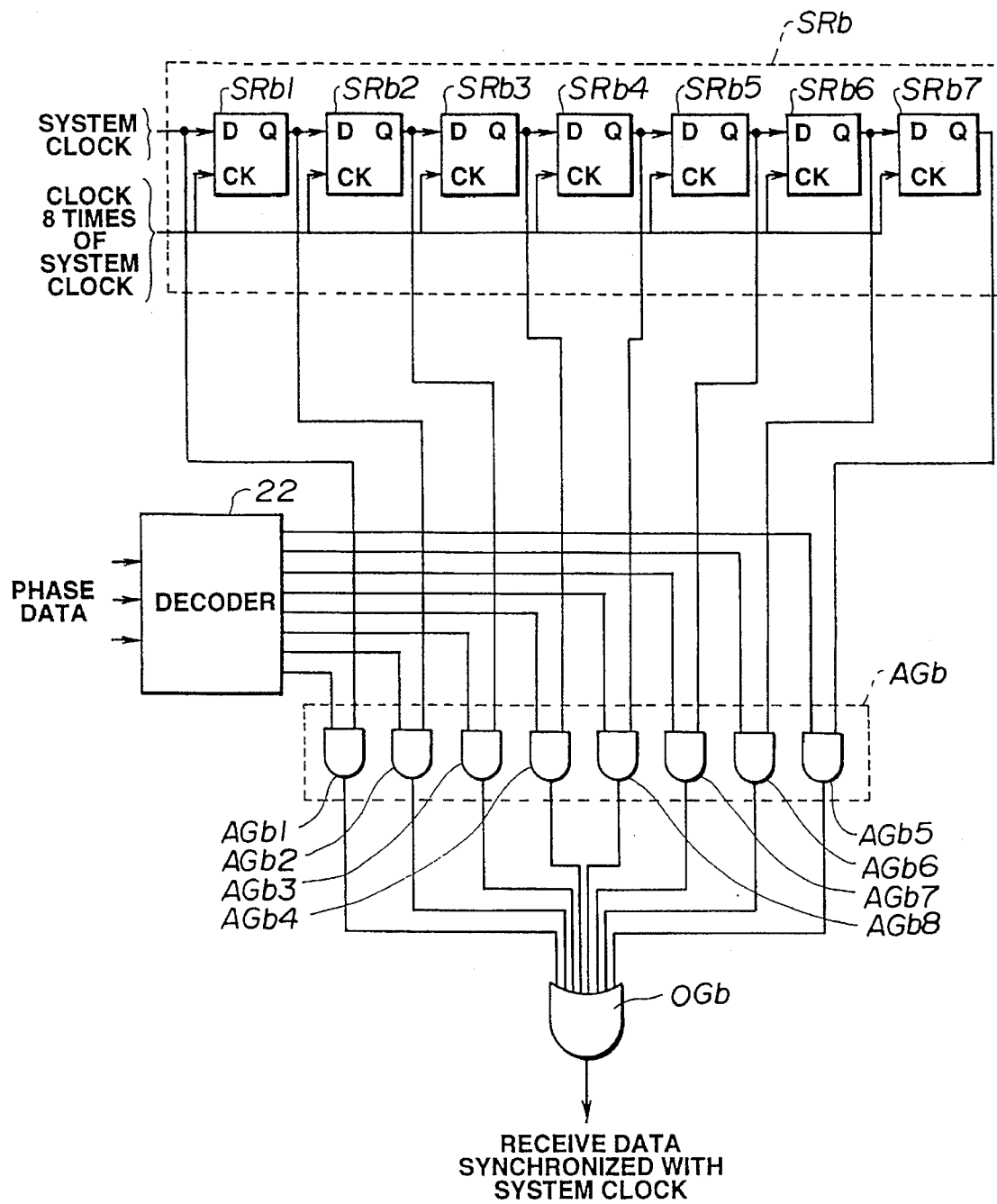
FIG. 7 is a circuit diagram of a data timing adjustment circuit in FIG. 5.

FIG. 7 is a detailed circuit diagram of the data timing adjustment circuit 12a or 12b. The data timing adjustment circuit 12a or 12b of FIG. 7 is the same as the sampling clock generation circuit 18 of FIG. 6, except that, in FIG. 7, the system clock applied to the shift registers in FIG. 6 is replaced by the receive data signal having timings different for the time slots received from the A/D converter 11a or 11b.

In FIG. 7, the receive data signal issued from the A/D converter 11a or 11b is applied to 7 stages of shift registers SRb (SRb1 to SRb7). The receive data signal applied to the shift registers SRb is shifted at intervals of ⅛ period of the system clock by a clock signal having a frequency 8 times of the frequency of the system clock. Data of the receive data signal corresponding to ⅛ period units of the system clock shifted at intervals of ⅛ period are applied from the shift registers SRb to a group of AND gates AGb (AGb1 to AGb8).

Meanwhile, 3-value signals of the phase data issued from the plural-time-slot control circuit 17 are applied to a decoder 22 to be decoded therein into 8-value data signals. The 8 decoded data signals are applied to the AND gate group AGb1 to AGb8.

Outputs of the AND gate group AGb1 to AGb8 are applied to an OR gate OGb so that the OR gate OGb, when receiving the outputs from the shift registers SRb and the outputs from the decoder 22, outputs the receive data. As a result, the receive data so far having timings different for the time slots are synchronized with the timing of the system clock and the respective time slots have a common clock.

Description will next be made as to a relationship between the system clock and the sampling clock generated by the sampling clock generation circuit 18.

Figure 8:
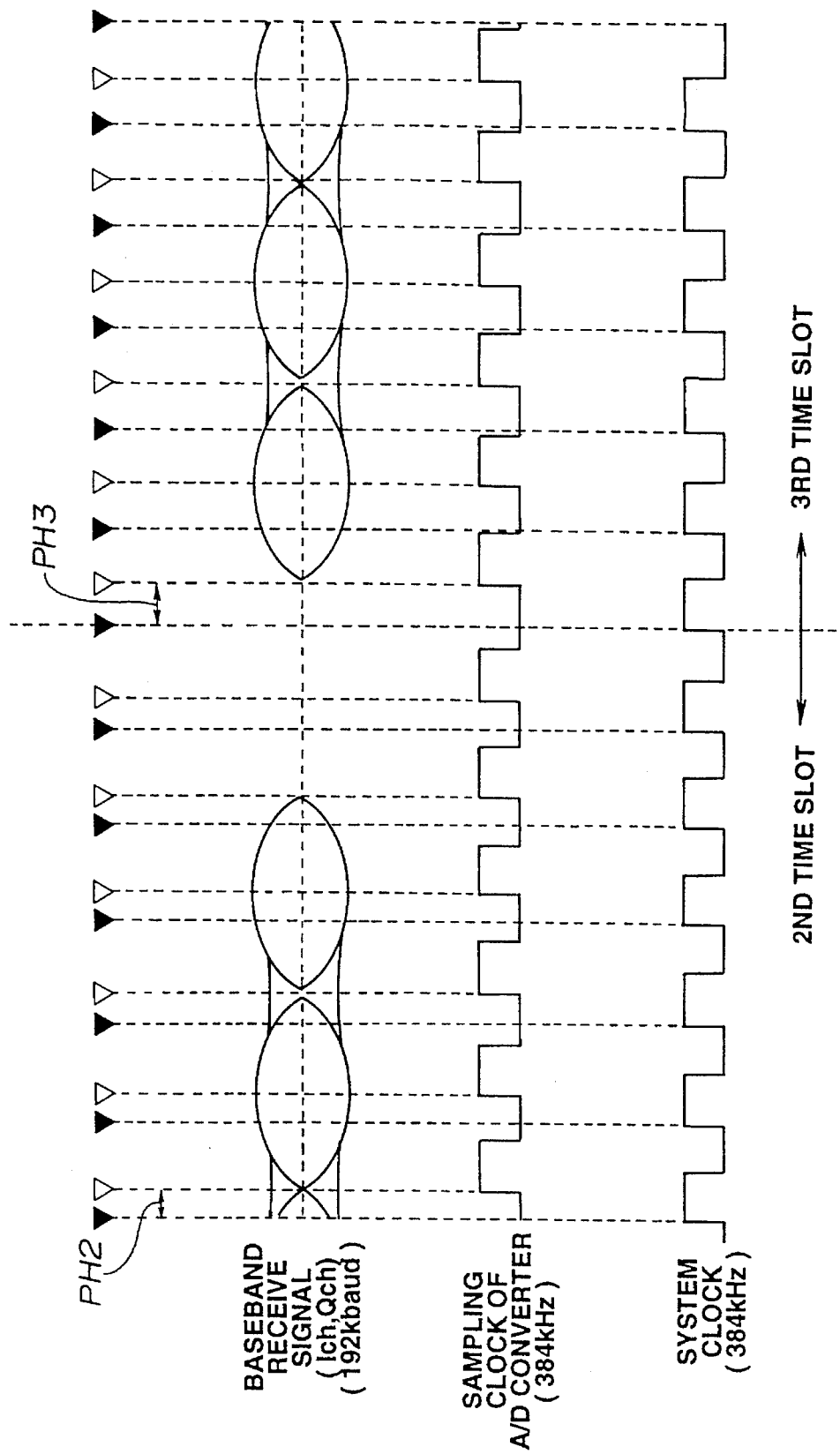
FIG. 8 is a timing chart for illustrating the sampling operation at A/D converters in FIG. 5.

FIG. 8 is a timing chart for illustrating the sampling operation of the A/D converters 11a and 11b.

In FIG. 8, the optimum sampling points of a received baseband signal are denoted by marks v where the eye of the pattern is fully opened and a sampling frequency is twice the frequency thereof. However, the received baseband signal has phases different for the time slots. More specifically, the received baseband signal has a phase error PH2 for the second time slot and a phase error PH3 for the third time slot with respect to the system clock common to the entire receiver of the base station CS. For this reason, points, at which the received baseband signal of 192 kilo-baud is sampled based on the system clock of 384 kbps, are denoted by marks, that is, the received baseband signal is sampled at its points shifted by the phase differences PH2 and PH3 for the respective second and third time slots. Accordingly, the sampling clock generation circuit 18, based on the phase data signal received from the plural-time-slot control circuit 17, generates the A/D conversion sampling clock corresponding to the system clock but which phase is changed for each time slot as shown by the marks v, whereby the received baseband signal can be sampled at the optimum sampling points.

Figure 9:
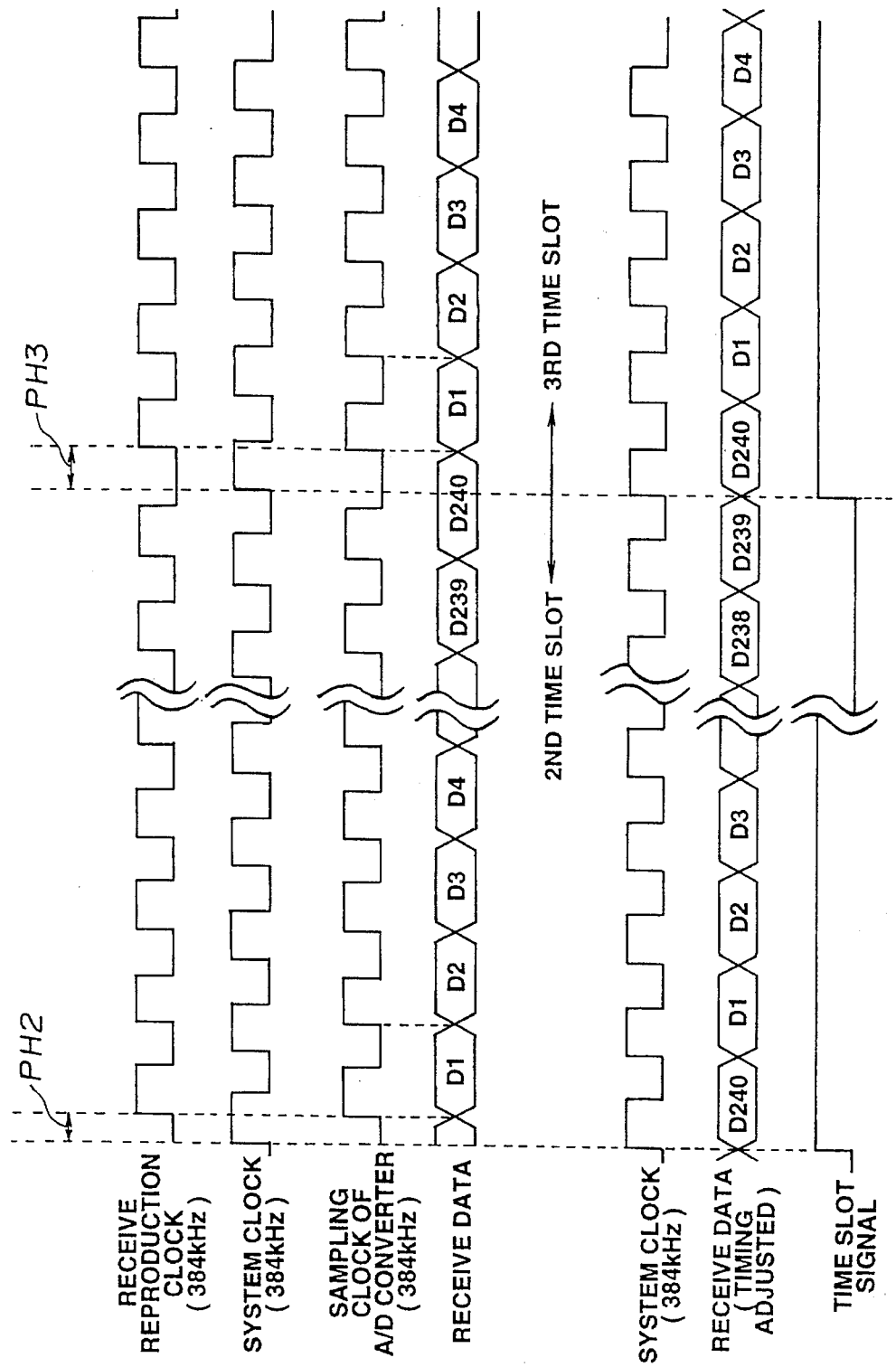
FIG. 9 is a timing chart for illustrating the operation of the sampling clock generation circuit and the data timing adjustment circuits in FIG. 5.

FIG. 9 is a timing chart for illustrating the operation of the sampling clock generation circuit 18 and data timing adjustment circuits 12a and 12b.

It is first assumed that the received baseband signal has the phase error PH2 for the second time slot and the phase error PH3 for the third time slot. Thus, a receive reproduction clock reproduced by the receive clock reproduction circuit 16 has the phase errors PH2 and PH3 for the second and third time slots with respect to the system clock. The phase errors PH2 and PH3 are output as the phase data signal from the plural-time-slot control circuit 17 to the sampling clock generation circuit 18, which in turn changes the phase of the system clock for each time slot based on the received phase data signal and generates a sampling clock signal on which the received baseband signal can be sampled in the optimum manner. As a result, the received baseband signal is sampled based on the sampling clock signal having clocks corresponding in number to the received baseband signal to form a receive data signal after the A/D conversion.

Thereafter, the timing of the receive data signal is phase-adjusted by the data timing adjustment circuits 12a and 12b so as to be synchronized with the system clock. As a result, the received baseband signal is delayed by an amount corresponding to the length of the shift registers used for the phase adjustment, i.e. to ½ period of the received baseband signal.

In the above-described manner, the received baseband signal is A/D converted at the optimum sampling points and the receive data signal after the A/D conversion is synchronized with the common system clock with the phase differences between the time slots of zero, so that subsequent processing of the digital signal processor 19 can be carried out based on the system clock.

More specifically, the data signals Ich and Qch after subjected to the digital signal processing in the judgement circuit 14 are added together by the I/Q composition circuit 15 and then output as a final demodulated receive data signal from the modem C4. It goes without saying that the subsequent processing of the demodulated signal is carried out based on the system clock in the subsequent TDMA section C3, audio codec section C2 and line interface C1.

For this reason, the need for phase adjustment for each time slot during the multiplexing/demultiplexing of the TDMA section C3 can be eliminated.

Although description has been made in connection with the example where the baseband signal demodulator of the present invention is employed for the base station CS in the first embodiment, the aforementioned baseband signal demodulator may be provided for the mobile devices PS1 to PS4.

As described above, in the first embodiment, it is unnecessary to change the digital processing clock for each time slot. Therefore, it is unnecessary to ensure a processing clock in a period exceeding the time slot due to the failure to complete the digital signal processing for one-time-slot data within the time slot.

Further, since the digital signal processing is carried out not based on the system clock common to the receiver, it becomes unnecessary to, in subsequent multiplexing/demultiplexing operations, synchronize the demodulate signal for each time slot with the system clock. Thus, a baseband signal processor can be small in size and power consumption.

A second embodiment will be described.

Figure 10:
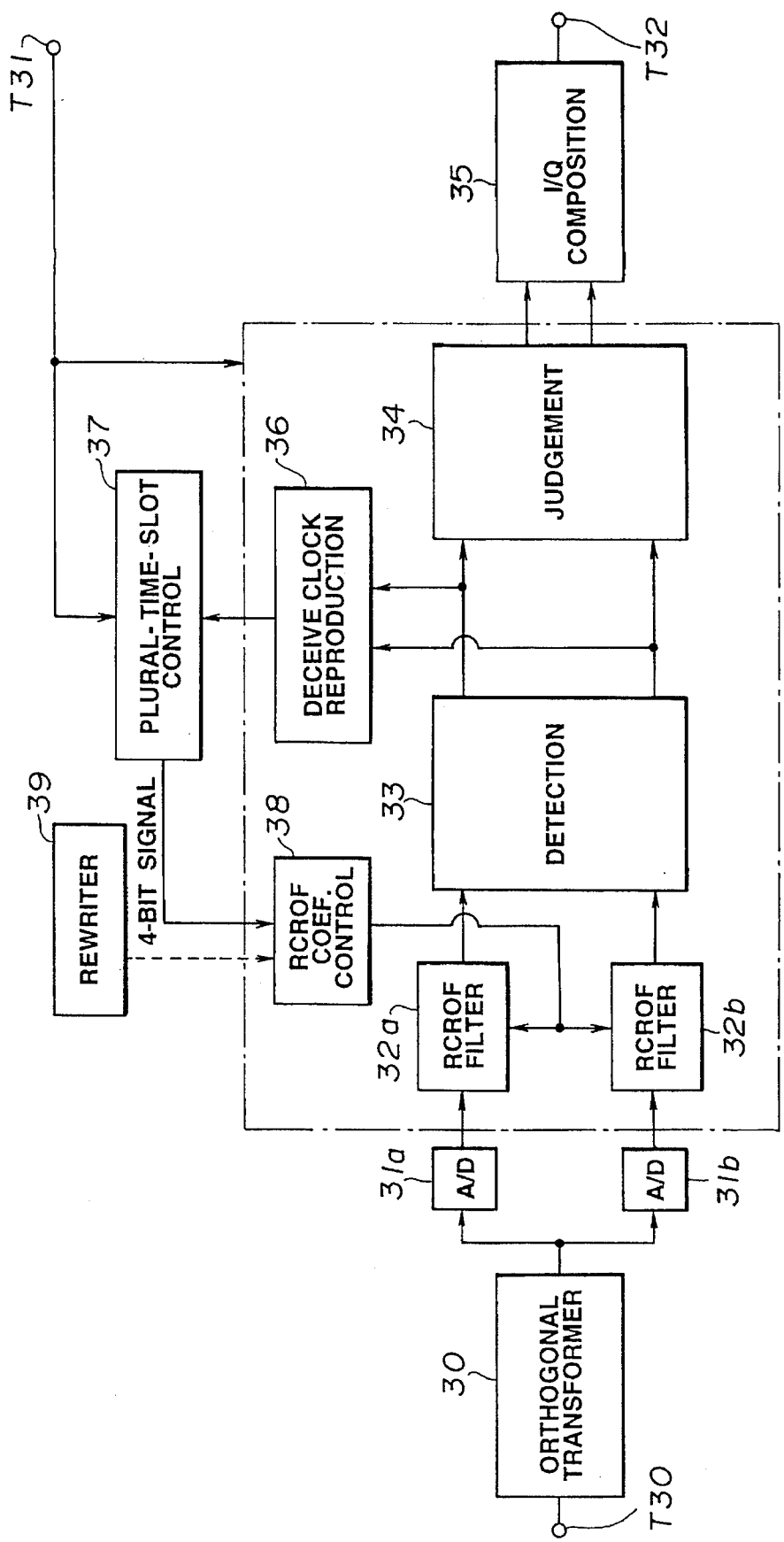
FIG. 10 is a block diagram of a baseband signal demodulator in accordance with a second embodiment of the present invention.

FIG. 10 illustrates a block diagram of a baseband signal demodulator in accordance with the second embodiment of the present invention. The baseband signal demodulator of the second embodiment substantially corresponds to the baseband signal demodulator of the first embodiment with substantially, the same functions as the first embodiment. The baseband signal demodulator of the second embodiment will be described in connection with the case where the present demodulator is applied to the digital radio communication system of FIG. 1.

In the baseband signal demodulator of FIG. 10, a baseband signal applied to a terminal T30 is subjected by an orthogonal transformer 30 to an orthogonal modulation into receive signals of channels I and Q. The I- and Q-channel receive signals are supplied to A/D converters 31a and 31b which convert received baseband signals into digital signals respectively. Further, output signals of the A/D converters 31a and 31b are supplied to root cosine roll off filters (which will be referred to merely as the RCROF filters, hereinafter) 32a and 32b respectively. Output signals of the RCROF filters 32a and 32b are detected by a detection circuit 33 which in turn outputs I- and Q-channel detection signals to a judgement circuit 34. The judgement circuit 34 judges the received I- and Q-channel detection signals whether the detection signals have a level of "1" or "0". An I/Q composition circuit 35 adds together the I- and Q-channel data signals judged by the judgement circuit 34 to demodulate them into the demodulated original data signal and then outputs it from a terminal T32. The demodulated signal issued from the terminal T32 is later decoded.

Meanwhile, a receive clock reproduction circuit 36 reproduces a reproduce clock from the output signals of the detection circuit 33. Based on the reproduce clock received from the receive clock reproduction circuit 36 and the system clock for common use of the entire base station CS received from a terminal T31, a plural-time-slot control circuit 37 outputs to a RCROF coefficient control circuit 38 a 4-bit control signal indicative of phase errors of the time slots relative to the system clock. The RCROF coefficient control circuit 38, based on the 4-bit control signal received from the plural-time-slot control circuit 37, outputs a coefficient data signal to the RCROF filters 32a and 32b.

A rewriter 39 is used for writing and changing the contents of a ROM wherein a relationship between the 4-bit control signal and the filter coefficients are stored.

Figure 11:
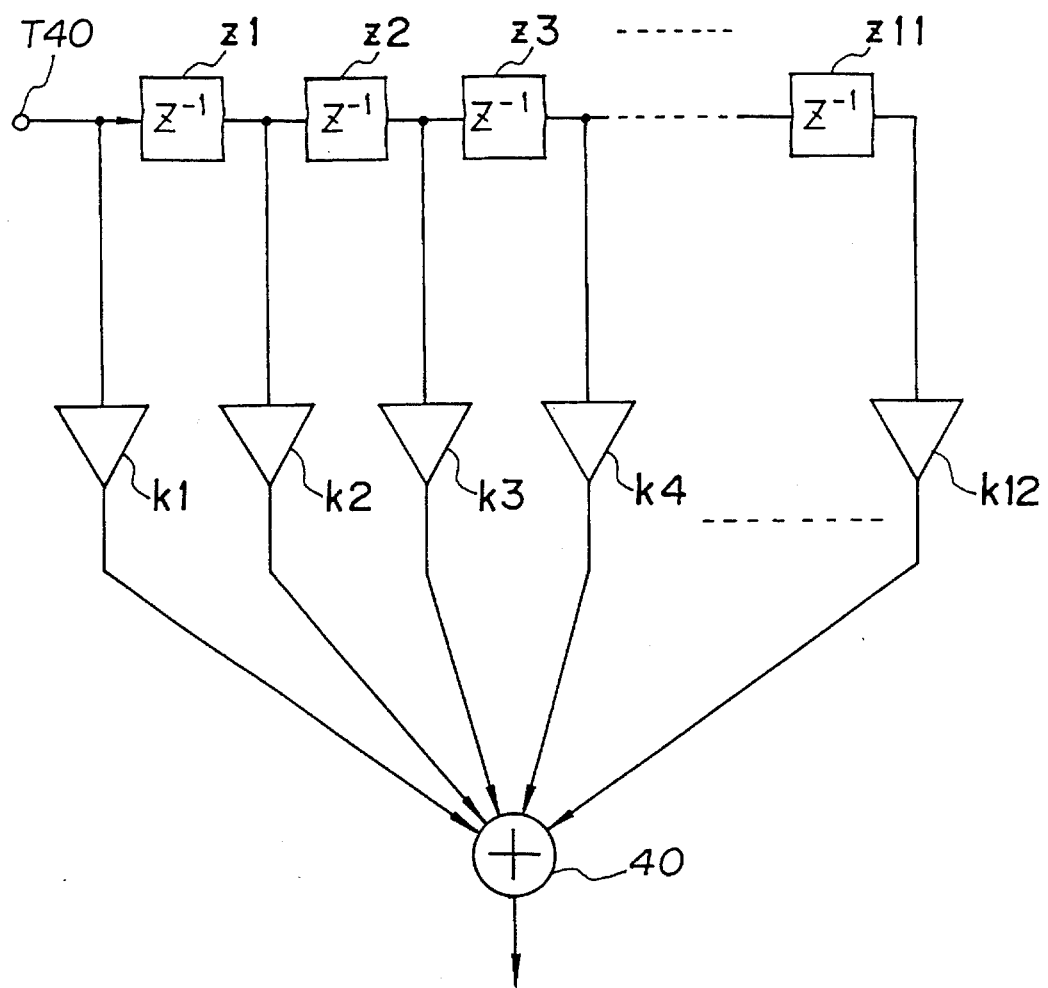
FIG. 11 shows a configuration of an RCROF filter in FIG. 10.

Description will next be directed to the interior structure of the RCROF filter 32a or 32b in FIG. 11. In the drawing, the receive data subjected by the A/D converter 31a or 31b to the digital signal is applied to an input terminal T40. The terminal T40 is connected to a delay circuit zone which output terminal is connected to an input terminal of a delay circuit z2. Similarly, the delay circuit is sequentially connected up to an input terminal of a delay circuit z11. Multipliers k1 to k12, which are connected to the input terminal T40 and the output terminals of the respective delay circuits z1 to z11, receive output data signals therefrom, multiply them by the coefficient data signal as a weight received from the RCROF coefficient control circuit 38, and apply the weighted data signals to an addition circuit 40 as their output signals. The addition circuit 40 adds together the weighted data signals received from the multipliers k1 to k12 and outputs a signal indicative of the receive data which phase is controlled by the coefficient data to the detection circuit 33. That is, the receive data signals issued from the A/D converters 31a and 31b are phase-controlled by the corresponding RCROF filters 32a and 32b and then sent therefrom to the detection circuit 33 as receive data signals. Such two-stage control is carried out in the first embodiment that the sampling operation is controlled by the A/D converters 11a and 11b and the phase adjustment of the receive data sampled at the optimum points is carried out by the data timing adjustment circuits 12a and 12b, whereas the single-stage control is carried out in the second embodiment that the sampling and phase adjustment are carried out only by the RCROF filters 32a and 32b.

Next, description will be made as to how to control the coefficient data applied to the multipliers k1 to k12 of the RCROF filters 32a and 32b by referring to FIG. 12.

Figure 12:
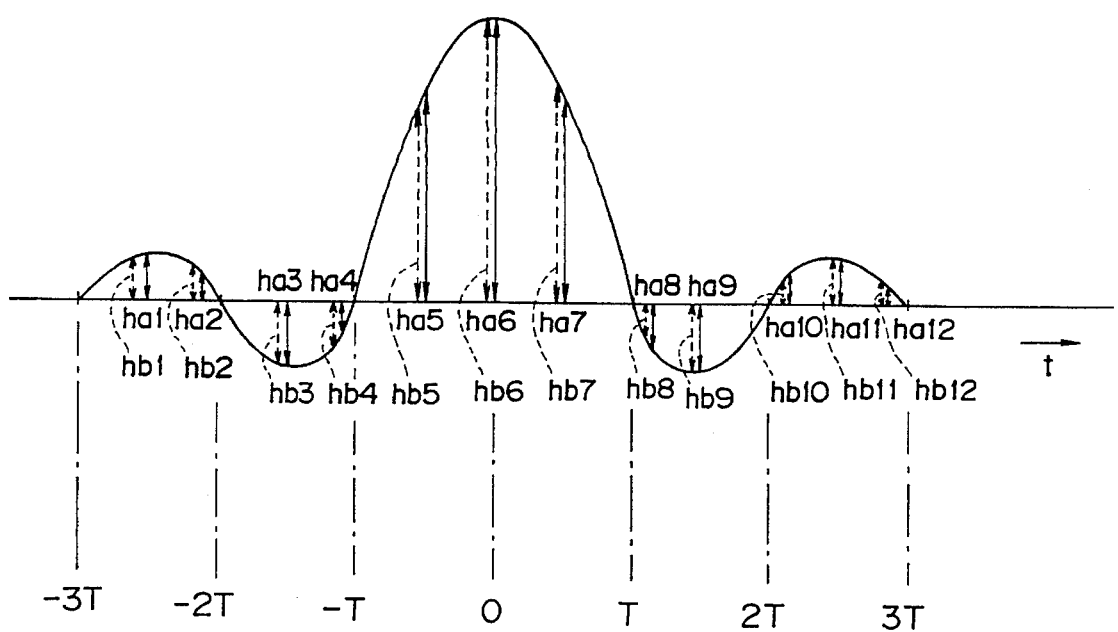
FIG. 12 is a diagram for illustrating how to determine coefficient data to be input to multipliers in the RCROF filters in FIG. 10.

FIG. 12 show how to take the coefficient data applied to the multipliers k1 to k12 of the RCROF filters 32a and 32b. In the illustrated example, it is assumed as an example that coefficients with 6 symbols and 12 taps are used and filtering is carried out at a rate corresponding to twice a symbol rate. The tap coefficients correspond to the coefficient data of the multipliers k1 to k12 in FIG. 11.

In FIG. 12, when filtered outputs of the RCROF filters are compared between tap coefficients ha1 to ha12 shown by solid lines and calculated tap coefficients hb1 to hb12 (shown by broken lines) forwardly shifted by a time corresponding to $1/16$ of the symbol rate, if the same input data is provided to the RCROF filters 32a and 32b, then the filtered output based on the tap coefficients hb1 to hb12 lags the filtered output based on the tap coefficients ha1 to ha12 by a time corresponding to $1/16$ of the symbol rate. This property is utilized for the phase control of the RCROF filters 32a and 32b. That is, the RCROF filters 32a and 32b, by suitably controlling the tap coefficients, perform its waveform shaping operation to suppress the interference between the codes of the output signal and to control the phase of the output signal. As a result, the receive signals for the respective time slots are controlled with respect to phase for the respective time slots to provide phase coincidence to the system clock.

Figure 13:
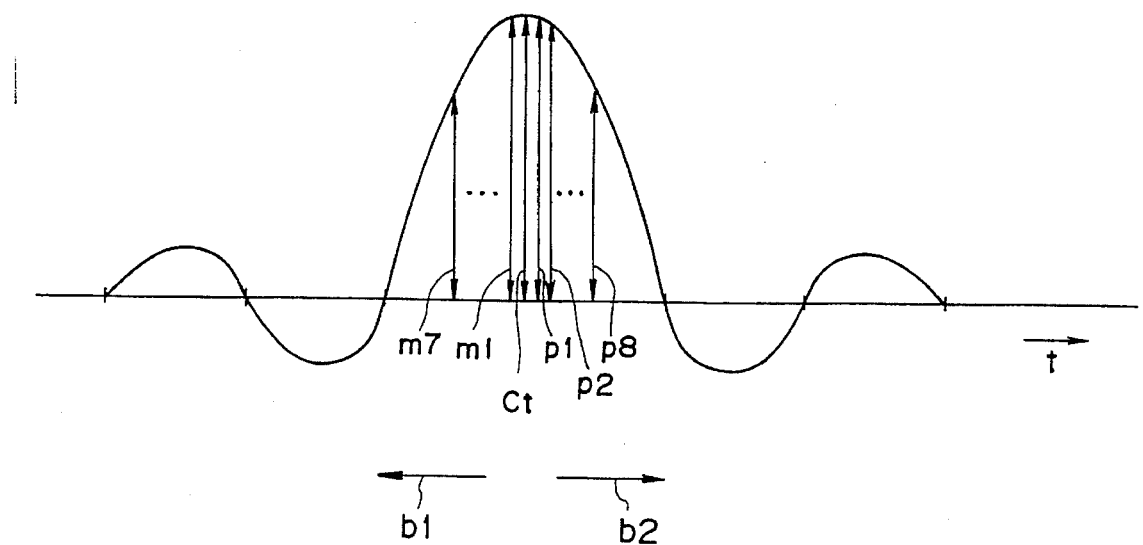
FIG. 13 is a diagram showing a variation in the output of the RCROF filter 32a when a tap coefficient ha6 is selected.

FIG. 13 is a diagram for illustrating how the output of the RCROF filters 32a and 32b varies depending on the selected values of the tap coefficient ha6. In the drawing, an arrow b1 indicates a phase lagging direction and an arrow b2 indicates a phase leading direction. With respect to a reference position shown by coefficient data ct, the position of coefficient data m1 lags the position ct by $1/16$ of the symbol rate, while a filter coefficient m7 lags the coefficient data ct by $7/16$ of the symbol rate. Further, a filter coefficient p1 leads the reference position ct by $1/16$ of the symbol rate, while a filter coefficient p8 leads the reference position by $8/16$ of the symbol rate. That is, the phase of the output signal of the RCROF filter is changed by using sixteen filter coefficients m7 to m1, ct and p1 to p8 at time intervals of $1/16$ of the symbol rate.

Although the above description has been made in connection with the central tap coefficient ha6 for convenience of explanation, the tap coefficients ha1 to ha5 and the tap coefficients ha7 to ha12 other than the tap coefficient ha6 may be similarly changed to have the same phase as in FIG. 12.

Figure 14:
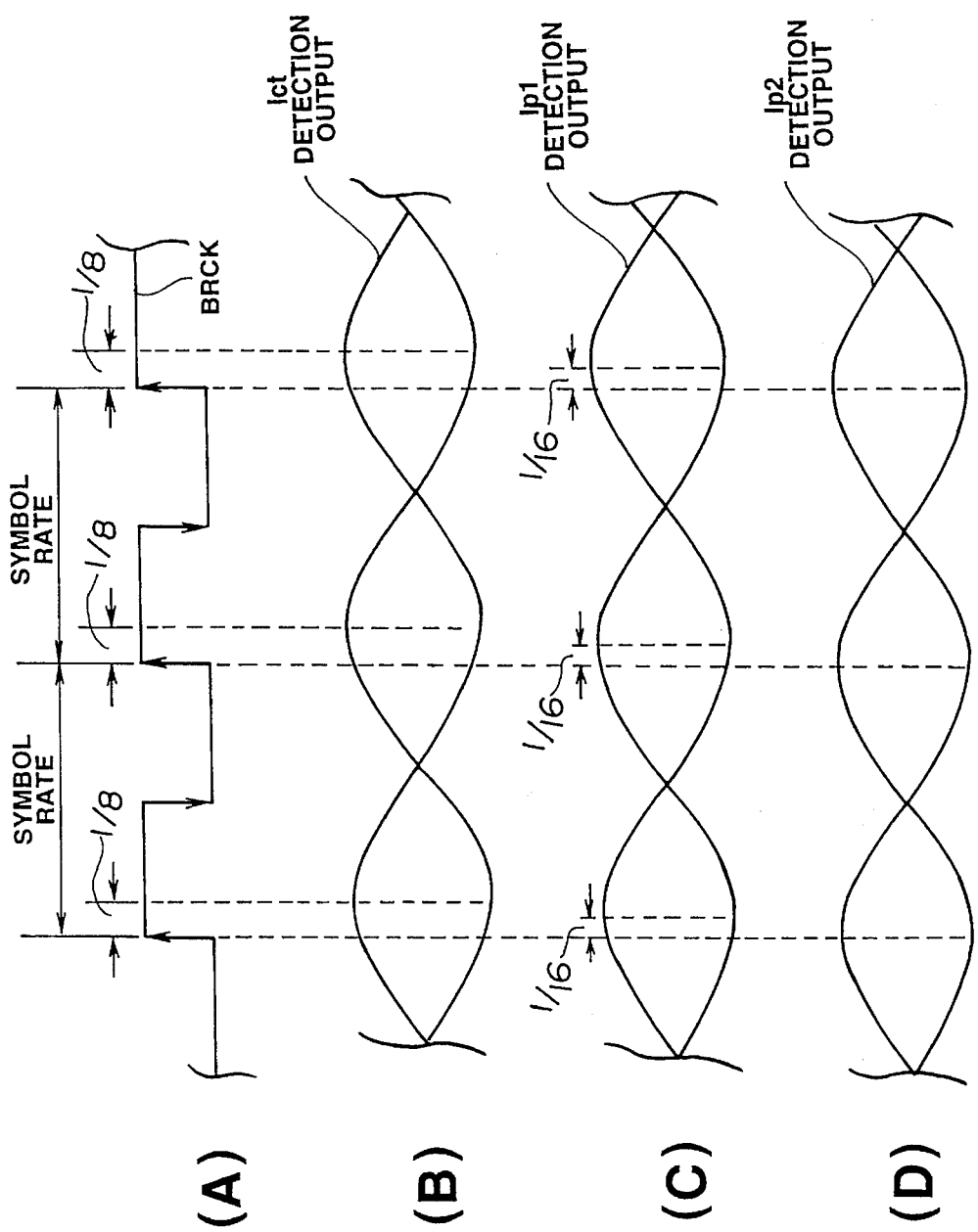
FIG. 14 shows variations in the output eye pattern of a detection circuit caused by the operation of an RCROF coefficient control circuit in FIG. 10.

FIG. 14 shows how the output eye pattern of the detection circuit 33 is varied with the coefficient control of the RCROF coefficient control circuit 38. It is assumed that, when the RCROF filters 32a and 32b use the filter coefficient ct shown in FIG. 13, a detection output Ict as shown in FIG. 14(B) rises with a phase lag of $1/8$ with respect to the rising of a baud rate clock BRCK as shown in FIG. 14(A).

When the RCROF filters 32a and 32b use the filter coefficient p1 leading by $1/16$ of the symbol rate for all the taps, the detection output Ict of FIG. 14(B) is changed to a detection output Ip1 as shown in FIG. 14(C) with respect to the same input as shown in FIG. 14(B).

When the RCROF filters 32a and 32b use the filter coefficient p2 lading by $2/16$ of the symbol rate for all the taps, the detection output Ict of FIG. 14(B) is changed to a detection output Ip2 as shown in FIG. 14(D) with respect to the same input as shown in FIG. 14(B).

Accordingly, waveform shaping is carried out in accordance with the filter coefficient p2, a detection output Ip2 as shown in FIG. 14(D) is output, that is, the rising of the baud rate clock BRCK coincides with the eye position of the eye pattern of the detection output Ip2.

Although phase control has been made by using the sixteen filter coefficients m7 to m1, ct, and p1 to p8 at intervals of $1/16$ in FIG. 13, the phase control may be made by using the 8 filter coefficients m6, m4, m2, ct, p2, p4, p6 and p8 at intervals of $1/8$ regularly omitted from the sixteen filter coefficients m7 to m1, ct, and p1 to p8. Even through the phase control, when the phase is delayed by $1/8$ with respect to the rising of the baud rate clock BRCK of FIG. 14 for example, a suitable detection output Ip2 as shown in FIG. 14(D) can be output that the eye position of the eye pattern coincides with the rising of the baud rate clock BRCK. The phase control with use of the 8 filter coefficients is rough but can be made simple and easy when compared with the phase control with use of the sixteen filter coefficients.

Figure 15:
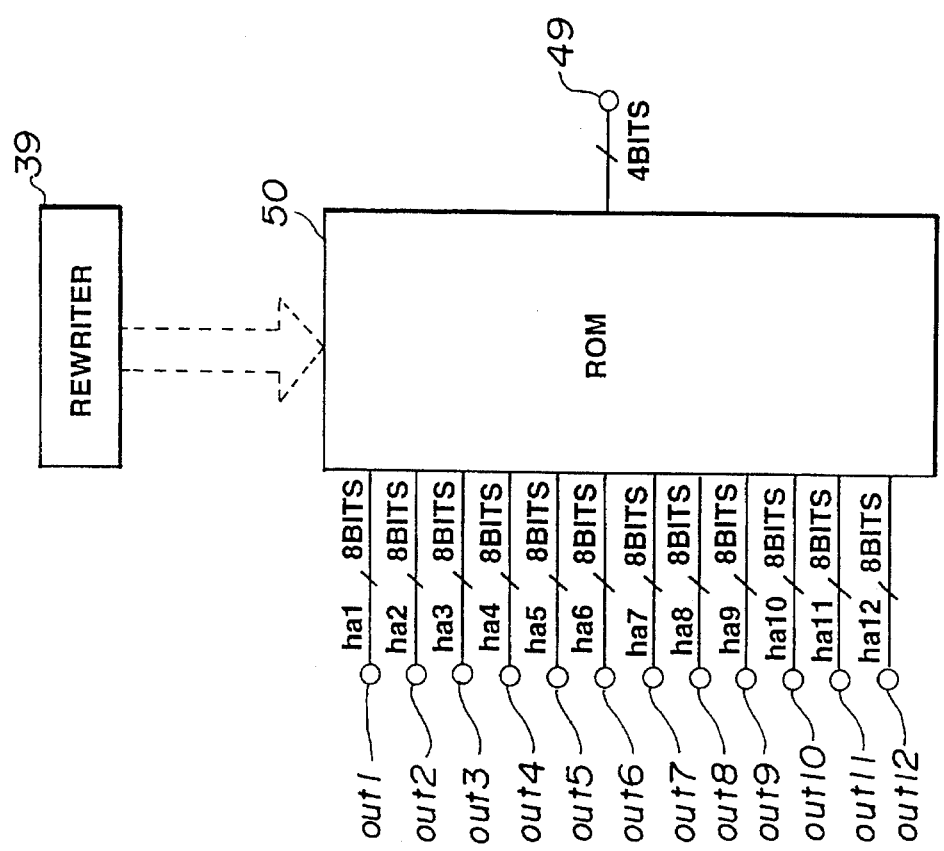
FIG. 15 illustrates an arrangement of the RCROF coefficient control circuit.

Description will next be made as to the RCROF coefficient control circuit 38 in FIG. 10 by referring to FIGS. 15 and 16.

As has been described in connection with FIG. 14, when the filter coefficient of the RCROF filters 32a and 32b is changed by the 4-bit control signal received from the plural-time-slot control circuit 37 of FIG. 10, the phase of the receive signal for each time slot is changed so that the eye pattern of the detection output can be shifted to the rising of the baud rate clock synchronized with twice the system clock. The RCROF coefficient control circuit 38 comprises, for example, a ROM 50 and a data bus as shown in FIG. 15, and the RCROF coefficient control circuit 38 outputs, according to the 4-bit address data control signal received from the plural-time-slot control circuit 37, the twelve tap coefficients ha1 to ha12 of each 8 bits previously stored from its output terminals out1 to out12 as shown in FIG. 16. As shown in FIG. 16, the filter coefficients ct, m1 to m7 and p8 to p1 of the ROM 50 of the RCROF coefficient control circuit 38 are positioned so that the detection output is delayed by $1/16$ of the symbol rate whenever the 4-bit address received from the plural-time-slot control circuit 37 is incremented by one, whereby the RCROF coefficient control circuit 38 outputs the tap coefficients ha1 to ha12 which take the filter coefficients into consideration.

In the present embodiment, since the sixteen filter coefficients ct, m1 to m7, and p8 to p1 are prepared for the addresses "0000" to "1111", when a suitable filter coefficient is specified according to the address, the phase can be arbitrarily shifted with the fine increment of $1/16$ of the symbol rate and the phase-controlled detection output can be obtained as already described in connection with FIG. 14.

Accordingly, in the RCROF filter 32a or 32b shown in FIG. 11, the data received from the A/D converter 31a or 31b is sequentially delayed, the sequentially delayed data are multiplied at the multipliers k1 to k12 by the tap coefficients that are received from the RCROF coefficient control circuit 38 and that take the filter coefficients for phase control into consideration for their weight, the outputs of the multipliers k1 to k12 are added together at the addition circuit 40, and the addition output is supplied from the addition circuit 40 to the detection circuit 33 in FIG. 10.

The value of the filter coefficient can be changed to an arbitrary value by connecting the rewriter 39 to the ROM 50 of the RCROF coefficient control circuit 38. Further, as already described above, the value of the filter coefficient can be decreased to half or increased. Of course, the rewriter 39 may be always connected to the ROM 50 as necessary.

Description will then be made as to the phase control operation of the entire baseband signal demodulator of FIG. 10.

For example, when the control signal of the 4-bit address "0000" is supplied from the plural-time-slot control circuit 37 to the RCROF coefficient control circuit 38, the RCROF coefficient control circuit 38 supplies to the RCROF filters 32a and 32b the tap coefficients ha1 to ha12 that take into consideration the filter coefficient ct corresponding to the above 4-bit address. The RCROF filters 32a and 32b perform their filtering operation based on the tap coefficients ha1 to ha12 received from the RCROF coefficient control circuit 38. The filtered outputs of the RCROF filters 32a and 32b are detected by the detection circuit 33.

For example, the detection output of the detection circuit 33 has a detection output Ict as shown in FIG. 14, the receive clock reproduction circuit 36 informs the plural-time-slot control circuit 37 of the fact that the eye pattern of the detection output lags the rising of the baud rate clock by ⅛ of the symbol rate. The plural-time-slot control circuit 37 holds the then delay phase amount and when receiving the next same time slot, outputs the address "1110" to the RCROF coefficient control circuit 38. The RCROF coefficient control circuit 38, based on the address "1110" received from the plural-time-slot control circuit 37, supplies to the RCROF filters 32a and 32b the tap coefficients ha1 to ha12 that take the filter coefficient p2 into account. The RCROF filters 32a and 32b perform their filtering operation based on the received tap coefficients ha1 to ha12. The filtered data are detected by the detection circuit 33 and the detection output of the detection circuit 33 coincides with the rising of the baud rate clock, which results in that the judgement circuit 34 can perform right judgement.

Thus, phase errors between the time slots can be removed, demodulated data for the respective time slots are output as synchronized with the system clock, after which the phase control between the slots can be made unnecessary.

In addition, since complicated timing adjustment is unnecessary, demodulation of the baseband signal can be realized with a high reliability and with a simple arrangement.

As described above, in the second embodiment, a plurality of filter coefficients are prepared for suppressing the interference between codes, the filter coefficients are changed for the time slots, and the detection outputs for the time slots are corrected with respect to phase. The phase correction is carried out by making the rising of the baud rate clock synchronized with twice the system clock to coincide to the eye position of the eye pattern of the detection output, whereby appropriate judgement is carried out without any errors.

Although the above description has been made in connection with the case where RCROF filters are used in the foregoing embodiments, the present invention is not limited to the specific example but the phase correction may be implemented by using another filter such as, for example, a cosine roll off filter or a Butterworth filter.

Further, the unit change of the filter coefficient can be arbitrarily set at a suitable value within a range causing no influence on the entire digital radio communication system. Since the ROM 50 can be formed to have a higher memory density, the ROM can exhibit the aforementioned function without affecting other constituent parts.

What is claimed is:

1. A baseband signal demodulator in a receiver for demodulating a received baseband signal, comprising:

receive clock reproduction means for reproducing a receive clock based on the received baseband signal;

phase error data generation means for generating phase error data indicative of a phase error between a system clock for control of the entire receiver and a receive clock reproduced by the receive clock reproduction means;

sampling clock generation means for changing a phase of the system clock based on the phase error data to generate an optimum sampling clock for the baseband signal;

receive data generation means for generating receive data corresponding to a sampled result of the baseband signal based on the optimum sampling clock; and data timing adjustment means for adjusting the receive data so as to synchronize with the system clock based on the phase error data.

2. A baseband signal demodulator as set forth in claim 1, wherein the sampling clock generation means includes:

delay means for shifting a phase of the system clock by units of clock resolution corresponding to a predetermined multiple of the system clock;

means for converting the phase error data into positional data indicative of positions of phase shifts by the units of the clock resolution; and means for outputting the optimum sampling clock when the system clock arrives at the positions indicated by the positional data.

3. A baseband signal demodulator as set forth in claim 1, wherein the data timing adjustment means includes:

delay means for shifting the phase of the receive data by units of clock resolution corresponding to a predetermined multiple of the system clock:

means for converting the phase error data into positional data indicative of residual phase shifts corresponding to phase shifts by the clock resolution units; and means for outputting the receive data when the receive data arrives at the position indicated by the positional data.

4. A baseband signal demodulator as set forth in claim 1, wherein the receive data generation means includes an A/D converter for sampling the received baseband signal based on the optimum sampling clock to generate a digital signal indicative of the receive data.

5. A baseband signal demodulator as set forth in claim 1, wherein the baseband signal is input for each of a plurality of time slots in TDMA communication.

6. A baseband signal demodulator as set forth in claim 1, wherein the receive data generation means and the data timing adjustment means are provided for the each baseband signal separated through orthogonal modulation.

7. A baseband signal demodulator as set forth in claim 1, further comprising digital signal processor means for subjecting the receive data outputted from the data timing adjustment means to a digital signal processing operation using the system clock.

8. A baseband signal demodulator in a receiver for demodulating a received baseband signal, comprising:

filter means comprising a root cosine roll off filter for performing a waveform shaping operation over a received baseband signal;

receive clock reproduction means for reproducing a receive clock based on the received baseband signal;

phase error data generation means for generating phase error data indicative of a phase error between a system clock for control of an entire receiver and a reproduced receive clock reproduced by the receive clock reproduction means; and filter coefficient control means for generating a filter coefficient of the filter means for correction of the phase error indicated by the phase error data to cause a phase of the baseband signal inputted to the filter to be controllably changed using the filter coefficient.

9. A communication system having a base station that includes a baseband signal demodulator for demodulating a received baseband signal, the baseband signal demodulator comprising:

filter means for performing waveform shaping operation over a received baseband signal;

receive clock reproduction means for reproducing a receive clock based on the received baseband signal;

phase error data generation means for generating phase error data indicative of a phase error between a system clock which controls the base station and a reproduced receive clock reproduced by the receive clock reproduction means; and filter coefficient control means for generating a filter coefficient of the filter means for correction of the phase error indicated by the phase error data, and for controlling and changing a phase of the baseband signal inputted to the filter.

10. A communication system as set forth in claim 9, wherein the filter coefficient control means includes memory means for storing a plurality of filter coefficients corresponding to a plurality of filter coefficients corresponding to a plurality of the phase errors indicated by the phase error data.

11. A communication system as set forth in claim 9, further comprising modification means for modifying the setting of the filter coefficients in the memory means.

12. A communication system as set forth in claim 9, wherein the baseband signal is input for each of a plurality of time slots in a TDMA communication.

13. A communication system as set forth in claim 9, wherein the filter means is provided for the each baseband signal separated through orthogonal modulation.

14. A communication system having a base station that includes a baseband signal demodulator for demodulating a received baseband signal, the baseband signal demodulator comprising:

filter means for performing waveform shaping operation over a received baseband signal;

receive clock reproduction means for reproducing a receive clock based on the received baseband signal;

phase error data generation means for generating phase error data indicative of a phase error between a system clock which controls the base station and a reproduced receive clock reproduced by the receive clock reproduction means; and filter coefficient control means for generating a filter coefficient of the filter means for correction of the phase error indicated by the phase error data, and for controlling and changing a phase of the baseband signal inputted to the filter, wherein the filter means comprises a root cosine roll off filter.

15. A communication system having a base station that includes a baseband signal demodulator for demodulating a received baseband signal, the baseband signal demodulator comprising:

filter means for performing waveform shaping operation over a received baseband signal;

receive clock reproduction means for reproducing a receive clock based on the received baseband signal;

phase error data generation means for generating phase error data indicative of a phase error between a system clock which controls the base station and a reproduced receive clock reproduced by the receive clock reproduction means;

filter coefficient control means for generating a filter coefficient of the filter means for correction of the phase error indicated by the phase error data, and for controlling and changing a phase of the baseband signal inputted to the filter;

data timing adjustment means for adjusting receive data so as to synchronize with the system clock based on the phase data error; and digital signal processor means for subjecting the receive data outputted from the data timing adjustment means to a digital signal processing operation by using the system clock.

* * * * *